Dec. 24, 1940.　　　　L. H. PALMER　　　　2,225,883
PRIME MOVER CONTROL SYSTEM
Filed Aug. 20, 1938　　　2 Sheets-Sheet 1
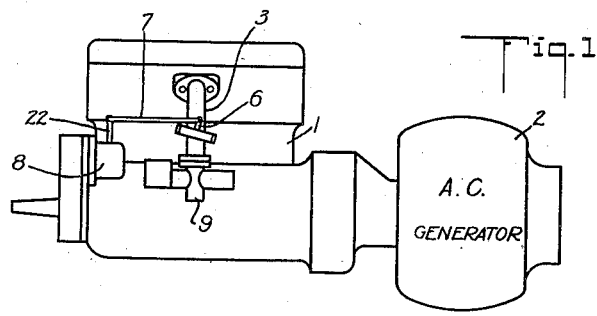
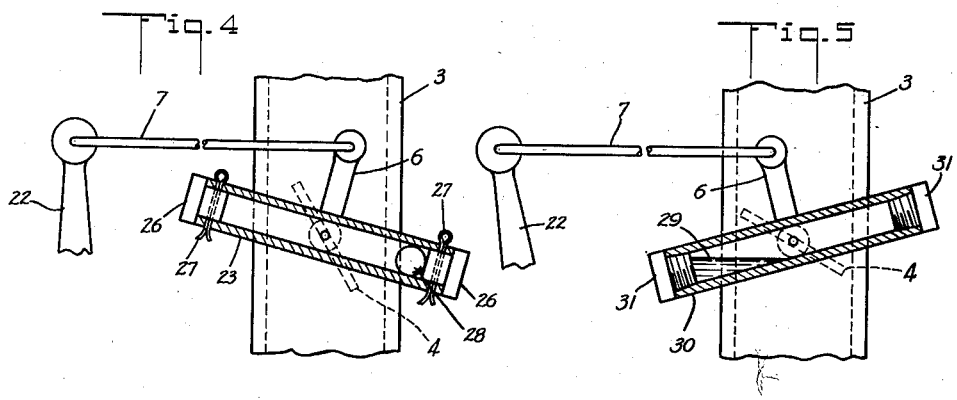
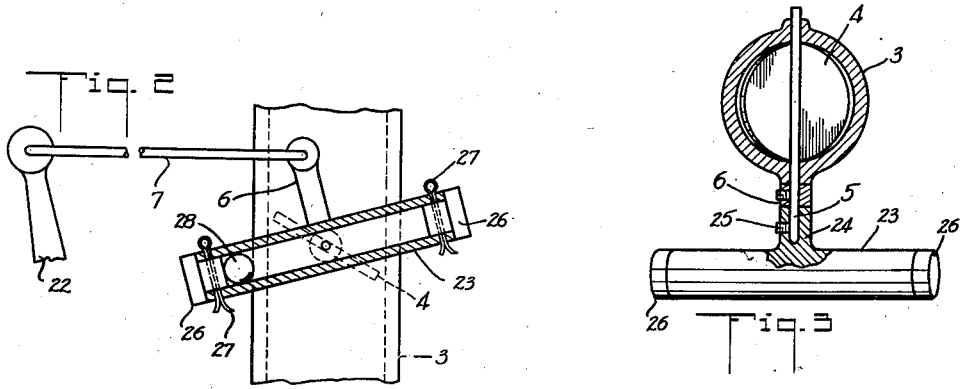
INVENTOR
Leroy H. Palmer
BY John Flam
ATTORNEY Dec. 24, 1940.     L. H. PALMER     2,225,883
PRIME MOVER CONTROL SYSTEM
Filed Aug. 20, 1938     2 Sheets—Sheet 2
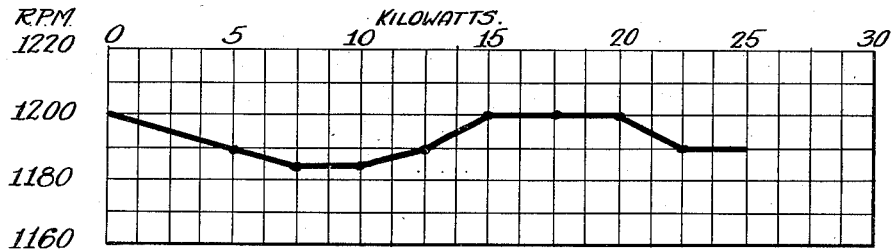
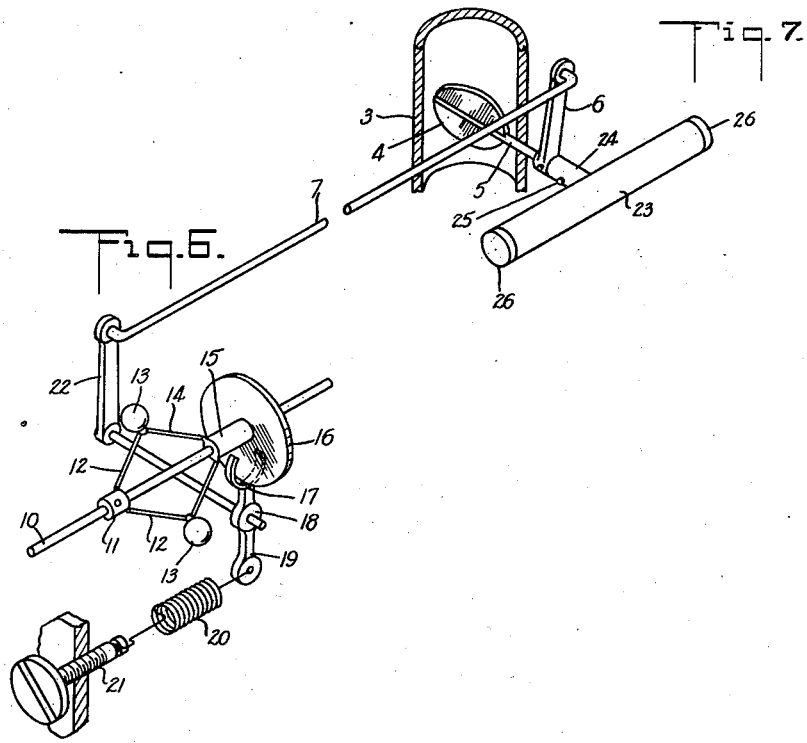
INVENTOR
Leroy H. Palmer
BY John Flam
ATTORNEY Patented Dec. 24, 1940

2,225,883

UNITED STATES PATENT OFFICE 2,225,883

PRIME MOVER CONTROL SYSTEM

Leroy H. Palmer, Bell, Calif.

Application August 20, 1938, Serial No. 225,971

3 Claims. (Cl. 264—4)

This invention relates to a power system including an internal combustion engine, connected to drive an electrical generator, such as an alternator.

This application is a continuation in part, of a prior application, now abandoned, Serial Number 124,783, filed February 8, 1937, in the name of Leroy H. Palmer, and entitled: "Governor action stabilizer."

The operation of alternators requires that the frequency of the current delivered be kept within reasonably small limits irrespective of the load on the alternator; and the electromotive force delivered at the terminals should also be kept to close limits. In large stationary generator plants, utilizing water wheels or steam turbines as the prime movers, the problem of speed maintenance has been quite satisfactorily met.

In farm lighting or power systems, or other systems that require the installations to be as inexpensive as possible, and also in portable systems, it has been customary to utilize an internal combustion engine as the prime mover. It is known that such a prime mover tends to vary quite widely in speed and in response to torque requirements. Accordingly, a governor control, ensuring adequate opening of the throttle for heavy load demands is required.

In ordinary centrifugal governors, it is common to load the action of the balls as by an adjustable spring. At any position of the governor balls, there is a corresponding position of the throttle. The entire movement of the governor shaft or sleeve in an axial direction, thus is intended to correspond to the range from idling to full load; and this movement is purposely kept small so as to fall within the limits of the permissive speed variation.

The difficulty in such governor control systems is to keep the governor stable, and to prevent excessive hunting, which tends to cause the governor to move the throttle to a greater extent than is required to stabilize the speed between the prescribed limits. Such hunting action may become quite pronounced, and may initiate persistent and rapid oscillations in speed.

It is one of the objects of the invention to make it possible to reduce the extent of variations in speed in systems utilizing internal combustion engines as prime movers.

This object is attained by the aid of a device that acts selectively to retard or to assist the operation of the centrifugal governor, as required for the stabilizing function.

It is another object of this invention to provide a device for altering the governor characteristics at a predetermined throttle position, corresponding to a certain portion of full load, whereby the speed droop of the prime mover is reduced.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring now to the drawings:

Figure 1 is a diagrammatic elevation illustrating a power system in which the invention is utilized;

Figs. 2 and 4 are enlarged views, partly in section, illustrating the manner in which the apparatus incorporating the invention is utilized in connection with the throttle of an internal combustion engine;

Fig. 3 is a view, partly in section, through the intake manifold of the internal combustion engine and shows the throttle in relation to the governor stabilizer;

Fig. 5 is a view similar to Fig. 2, but showing a modified form of the invention;

Fig. 6 is a pictorial diagrammatic view illustrating the train of mechanism between the governor and the stabilizer in relation to the engine throttle; and Fig. 7 is a graph illustrating the effect of the stabilizer upon a typical prime mover system.

In Fig. 1 the internal combustion engine 1 is indicated as the prime mover driving the alternating current generator 2, as through appropriate gearing or the like. The internal combustion engine 1 is shown as being provided with an intake manifold 3. Located within the intake manifold may be a throttle of the usual butterfly type. This throttle is not shown in Fig. 1, but is indicated by reference character 4 in Figs. 2, 3, 4, 5 and 6. It may be provided with the shaft 5 (Fig. 3) to which may be attached the operating lever 6. This operating lever is in turn adapted to be actuated by a link 7 that, as will be described hereinafter, is arranged to be operated by a governor mechanism indicated in general as enclosed in a casing 8 in Fig. 1.

The fuel mixture in the form of a gas mixture or a vapor mixture or the like, may be drawn into the manifold 3 past the throttle mechanism through any appropriate mixing or metering device 9.

The installation as thus far described has been used in connection with portable electric power systems. Such systems have been utilized for driving alternating current generators of from about 5 to 25 kilowatts, the output of which is used for driving farm machinery and for operating lights or the like. Since many of the load devices are intended to operate at an approximately synchronous rate, such as induction motors, and since the electromotive force delivered by the generator 2 is also a function of its speed, it is apparent that speed variations through the range of load should be maintained within tolerable limits. It is for this reason that the governor mechanism 8 is provided. Although theoretically such a governor mechanism is capable of adjusting the throttle 4 through its entire range for relatively minor deviations from the desired speed, it is found that speed droop or variations in speed incident to changes in the load on the generator with consequent wide oscillations in the frequency and in the electromotive force output of the generator can not readily be prevented. While of course in a stationary power plant installation such speed droop can be effectively controlled by the aid of comparatively expensive apparatus, it is apparent that such apparatus is not reasonably utilizable nor suitable in an installation of the character referred to, in which an internal combustion engine is used.

In order to solve this problem effectively for portable systems of this character, use is made of a stabilizer device. In order to explain the action of this device reference may be had first of all to Fig. 6 which illustrates a typical governor control mechanism for the throttle 4.

In this figure a conventional type of centrifugal ball governor is illustrated. Thus the shaft 10 of the governor is shown as having affixed to it a collar 11 serving to provide pivots for a number of fly-ball governor arms 12. The ball weights 13 are also shown as connected by the pivoted links 14 to a sleeve 15 axially slidable upon the shaft 10. This sleeve is shown as carrying a disk 16. As the speed increases, the balls 13 fly outwardly and the disk 16 is thereby moved toward the left as viewed in Fig. 6. A reduction in speed causes the disk 16 to be moved toward the right.

It is customary in governors of this type to provide a force that resiliently opposes the action of the centrifugal force upon the balls 13. In the present instance this is illustrated by the fork 17 embracing the disk 16 and fixed to a rock shaft 18. The fork has an extending arm 19 to which is anchored one end of a tension spring 20. The other end of the tension spring is shown as anchored in an adjustable abutment such as a screw 21. By the aid of the screw 21 the tension of spring 20, and consequently the force opposing the centrifugal action of the balls 13 may be adjusted.

The rock shaft 18 is operated by the axial movement of the disk 16 by the aid of the fork 17. This rock shaft accordingly may be utilized to provide the connection between the governor and the throttle control lever 6. This may be accomplished by the arm 22 (also shown in Figs. 1, 2, 4 and 5) and fixed to shaft 18. To this arm 22 the actuating link 7 is attached.

Theoretically, the disk 16 is intended to have but slight axial movement in order to control the throttle 4 between its idling position and its full open position. In actual practice it has been found that for light loads the governor action is quite satisfactory, that is, for loads not greater than about 50 to 60% of full load. Under such circumstances the throttle 4 is apparently moved quite enough to take care of any increase in loads up to that limit.

However, as heavier loads are demanded beyond one-half or two-thirds of the full rated load, the governor does not have a sufficiently complete action on the throttle 4.

These phenomena are due to the particular characteristics of the internal combustion engine. Inherently the internal combustion engine is not a constant speed device. Any material increase of load causes the engine to slow down very materially. At loads corresponding to those near idling loads, the speed variation is not so pronounced.

In order to enable the governor mechanism to conform to these requirements imposed by the inherent characteristics of the internal combustion engine, use is made of an apparatus which during idling and up to an intermediate value of load, has an action opposing the opening of the throttle by the governor; but beyond that point an action takes place to aid the governor in urging the throttle 4 toward open position.

In the embodiment of the invention illustrated in Figs. 2, 3 and 4, this effect is obtained by providing a tubular structure with a movable weight therein such as a ball. Thus mounted upon the extension of shaft 5 is a tube 23. This may be accomplished, for example, by providing a boss 24 attached as by set screw 25 to the throttle shaft 5. It is possible in this manner to adjust the relative angular position of the tube 23 with respect to the throttle 4. The tube 23 is furthermore shown as closed at both ends as by the aid of the plugs 26, which may be held detachably in place as, for example, by the cotter pins 27. Adapted to roll within the tube is the ball weight 28.

As illustrated in Fig. 2, the relative angular positions of the axis of the tube 23 and of the throttle 4 are such that in the idling position illustrated in Fig. 2 the ball 28 is effective to urge the throttle 4 toward closing. This action is maintained until the throttle 4 is opened by the governor action to a point corresponding to about 60% of the rated load. At that point the ball 28 rolls to the opposite end of the tube 23, and ultimately for full load the tube 23 takes the position illustrated in Fig. 4. The position of the axis of the tube 23 with respect to the pivoting axis of throttle shaft 5 is such that the weight or ball 28 is in unstable equilibrium when the axis of the tube 23 is on the horizontal, and any increment of rotation beyond the horizontal causes the weight to move to the lowered end of the tube. In this unstable horizontal position the weight 28 is neutral as regards its effect on the governor.

By appropriate proportioning of the weight 28 and of the length of the tube 23 to provide the necessary leverage, and in accordance with the setting of the adjusting screw 21 for the governor spring 20, the required limits of speed variation may be attained. Furthermore, the moving weight 28 also serves to take out any lost motion between the connections 22, 7 and 6.

In the form of the invention illustrated in Fig. 5, a heavy liquid 29 such as mercury, may be substituted for the ball weight 28. In other respects this form of the invention is quite similar to that already described. The tube 30, however, is shown in this instance as closed by the threaded caps 31. Since the position of the center of gravity of the fluent liquid is not fixed as regards the liquid, the actual leverage arm upon which the liquid acts is a function of the angular position of the tube 30. For angles slightly below the horizontal, the lever arm is considerably smaller than for larger angles. This causes the device to have an increased effect as the tube 10 tilts downwardly as the throttle 4 is opened.

By reference to the graph shown in Fig. 7, the action of the governor stabilizer, of the liquid weight type of Fig. 5, may be more readily understood. This graph is merely of a typical installation and illustrates a full load output of 20 kilowatts for generator 2. The generator has a normal speed of 1200 R. P. M.

It is seen that from idling to about 10 k. w. output the speed drops to about 1185 R. P. M., a decrease of 15 revolutions, representing a change of about one and one half percent.

At some point in the low load range, at about 10 k. w. in the example shown, the liquid 29 shifts its center of gravity sufficiently toward the axis of the throttle shaft so as to have a reduced retarding effect on spring 20, and therefore spring 20 can cause the throttle to open sufficiently to not only check the drop in speed, but to cause a slight increase.

As the load increases, the throttle is opened wider and the tube 30 more and more nearly approaches the horizontal position, so that the force exerted by liquid 29 opposing spring 20 becomes progressively less, the speed approaching normal. At about three quarters load (15 k. w. in the example shown) the speed has reached normal or 1200 R. P. M. and the tube 30 has reached a horizontal position. The liquid 29 is then in unstable equilibrium. Further increase in the load causes the throttle to be opened further with a resulting inclination of tube 30 which causes liquid 29 to flow away from the throttle shaft on the opposite side of the axis thereof, so that the center of gravity of liquid 29 recedes from the throttle axis and has an increased assisting effect on spring 20. This maintains the speed substantially constant until full load or 20 k. w. is reached. Further increase in the load, until an overload of about 25 k. w. is reached, causes the speed to drop approximately 10 R. P. M., or less than one per cent. The resulting variation from the desired 60 cycle frequency for the entire load range is thus maintained well within one cycle, which can be readily tolerated.

If a ball weight as in the form of Fig. 4 is used, the action is more abrupt. After an initial slight speed droop, tube 23 passes through its horizontal position, and ball 28 abruptly shifts to a position where it assists spring 20. Throttle 4 is thus opened to cause a relatively sudden increase in speed at this loading. As full load is approached, there is less increase in speed.

What is claimed is:

1. In combination, a centrifugal governor adapted to operate upon a fuel throttle, said governor being provided with means to assist movement of the governor in a direction corresponding to an increase in throttle opening, and a moving weight mechanism for supplementarily influencing said governor, comprising a guide having a transverse axis and connected so that the angular position of the guide about said axis is a function of the throttle position, and a weight cooperating with the guide, the angular position of the guide with respect to the axis when the throttle has a definite position that is intermediate the no load and full load positions being such that said weight is then in unstable equilibrium with respect to the guide, and neutral with respect to the effect of the weight on the governor, whereby passage of the throttle through said definite intermediate position toward larger opening position of the throttle will cause the weight to move unobstructedly to a position of stable equilibrium determined by the end of the guide, to assist the governor to open the throttle, said weight remaining in stable position until the guide reaches the horizontal position in its movement toward smaller opening position of the throttle.

2. In combination, a centrifugal governor adapted to operate upon a fuel throttle, said governor being provided with means to assist movement of the governor in a direction corresponding to an increase in throttle opening, and a moving weight mechanism for supplementarily influencing said governor, comprising a tubular unobstructed guide having an axis of angular motion transverse to the axis of the tube and connected so that the angular position of the tube about said transverse axis is a function of the throttle position, and a weight adapted to roll in the tube, the angular position of the tube axis with respect to the transverse axis when the throttle has a definite position that is intermediate the no load and full load positions being such that said weight is then in unstable equilibrium in the tube, and neutral with respect to the effect of the weight on the governor, whereby passage of the throttle through said definite intermediate position toward larger opening position of the throttle will cause the weight to roll to a stable position determined by the limit of the guide to assist the governor to open the throttle, said weight remaining in stable position until the guide reaches the horizontal position in its movement toward smaller opening position of the throttle.

3. In combination, a centrifugal governor adapted to operate upon a fuel throttle, said governor being provided with means to assist movement of the governor in a direction corresponding to an increase in throttle opening, and a moving weight mechanism for supplementarily influencing said governor, comprising a tubular unobstructed guide having an axis of angular motion transverse to the axis of the tube and connected so that the angular position of the tube about said transverse axis is a function of the throttle position, and a heavy liquid confined in the tube, the angular position of the tube axis with respect to the transverse axis when the throttle has a definite position that is intermediate the no load and full load positions being such that said liquid is then in unstable equilibrium in the tube, and neutral with respect to the effect of the weight of the liquid on the governor, whereby passage of the throttle through said definite intermediate position toward larger opening position of the throttle will cause the liquid to move in the tube toward the end thereof and to a position determined by the end of the guide to assist the governor to open the throttle, said liquid remaining in stable position until the guide reaches the horizontal position in its movement toward smaller opening position of the throttle.

LEROY H. PALMER.